United States Patent
Kunimatsu et al.

(10) Patent No.: US 9,360,709 B2
(45) Date of Patent: Jun. 7, 2016

(54) LIQUID CRYSTAL DISPLAY DEVICE

(71) Applicant: Japan Display Inc., Tokyo (JP)

(72) Inventors: Noboru Kunimatsu, Tokyo (JP); Yasushi Tomioka, Tokyo (JP); Hidehiro Sonoda, Tokyo (JP); Yosuke Hyodo, Tokyo (JP); Yasuo Imanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 36 days.

(21) Appl. No.: 14/458,308

(22) Filed: Aug. 13, 2014

(65) Prior Publication Data

US 2015/0055070 A1    Feb. 26, 2015

(30) Foreign Application Priority Data

Aug. 20, 2013    (JP) .................. 2013-170267

(51) Int. Cl.
*G02F 1/1337*    (2006.01)
*G02F 1/1339*    (2006.01)
*G02F 1/1333*    (2006.01)

(52) U.S. Cl.
CPC ........ *G02F 1/133788* (2013.01); *G02F 1/1339* (2013.01); *G02F 1/133345* (2013.01); *G02F 1/1337* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0106462 A1* | 8/2002 | Park | ................... | G02F 1/133711 428/1.2 |
| 2003/0223029 A1* | 12/2003 | Lee | ................ | G02F 1/1341 349/153 |
| 2006/0061719 A1 | 3/2006 | Tomioka et al. | | |
| 2008/0192195 A1* | 8/2008 | Liao | .................. | G02F 1/1339 349/130 |
| 2010/0309416 A1* | 12/2010 | Gotoh | ............... | G02F 1/133514 349/123 |
| 2011/0176097 A1 | 7/2011 | Shiromoto et al. | | |

FOREIGN PATENT DOCUMENTS

JP    2004-206091 A1    7/2004
JP    2011-145535 A1    7/2011

* cited by examiner

*Primary Examiner* — Wen-Ying P Chen
(74) *Attorney, Agent, or Firm* — TYPHA IP LLC (57) ABSTRACT

A TFT substrate and a counter substrate are bonded via a seal material. Alignment films are applied to entire surfaces of the TFT substrate and the counter substrate so as to realize even thickness of the alignment film. This allows a display region to be formed up to the area around the seal material. The alignment film is photo-alignment processed. An organic film formed of the material which is not photo-aligned is interposed between the alignment film and the seal material. High bonding strength between the organic film and the seal material improves reliability of a seal portion as well as reduces a frame region.

7 Claims, 8 Drawing Sheets

|  | PHOTO-ALIGNMENT COMPONENT | OTHER COMPONENT |
|---|---|---|
| ALIGNMENT FILM | 20~100% | 80~0% |
| ORGANIC FILM | 0% | 100% |
| ALIGNMENT FILM OF SEAL PORTION | <20% | >80% |

LIQUID CRYSTAL DISPLAY DEVICE

BACKGROUND OF THE INVENTION (1) Field of the Invention

The invention relates to a display device. More specifically, the invention relates to a liquid crystal display device capable of increasing a display region relative to a predetermined outline region, that is, realizing a narrow frame through the photo-alignment process.

(2) Description of the Related Art

The liquid crystal display device is configured to include a TFT substrate in which pixels with pixel electrodes and thin film transistors (TFT) arranged in a matrix, and a counter substrate opposite the TFT substrate, having a color filter and the like formed at a location corresponding to the pixel electrode of the TFT substrate. A liquid crystal is interposed between the TFT substrate and the counter substrate. An image is formed by controlling light transmittance of the liquid crystal molecule for each pixel.

The liquid crystal display device with a flat and light structure has been widely used in various fields. A compact liquid crystal display device has been widely applied to the mobile phone and DSC (Digital Still Camera). It is strongly demanded that the compact liquid crystal display device should expand its display region while keeping the small outline region. In the aforementioned circumstances, the width defined by the end of the display region and the end of the liquid crystal display device is reduced, thus demanding the narrow frame.

A seal material for bonding the TFT substrate and the counter substrate is formed on the frame region. An alignment film for bringing the liquid crystal into an initial alignment state is formed on the display region of the liquid crystal display device. The alignment film is required to completely seal the display region, and accordingly, the area to which the alignment film is applied has to be larger than the display region by a predetermined width. Meanwhile, presence of the alignment film between the seal material and the TFT substrate or between the seal material and the counter substrate may impair bonding reliability of the seal material. The end of the applied alignment film, thus has to be strictly controlled.

The alignment process for the alignment film may be executed through any one of the rubbing process and the photo-alignment process. JP-A-2004-206091 discloses the use of photo-alignment to execute: (1) reduction in alignment disorder owing to complicated stepped structure of the pixel part, and (2) prevention of the influence of static electricity generated in rubbing, disordered tip of yarns of the rubbing cloth, and foreign substances generated by rubbing. The viewing angle is an important property for the liquid crystal display device. A method of IPS (In Plane Switching) rotates the liquid crystal molecules parallel to the substrate so as to control intensity of light that transmits through the liquid crystal layer, thus providing excellent viewing angle property. On the contrary, the liquid crystal display device of IPS type that requires no pre-tilt angle is suitable for the photo-alignment process.

The alignment film is applied through flexography or ink jetting. Upon application of the liquid material for forming the alignment film, it wettedly spreads. It is therefore difficult to control the end of the applied material. Especially when applying the alignment film through ink jetting, it is further difficult to control the application because of low viscosity of the material for forming the alignment film.

JP-A-2011-145535 discloses the structure that forms an additional frame-like alignment film outside the alignment film formed on the display region, which serves as the stopper for controlling the alignment film to be formed on the display region. The structure controls the application range of the alignment film on the display region.

Figure 13:
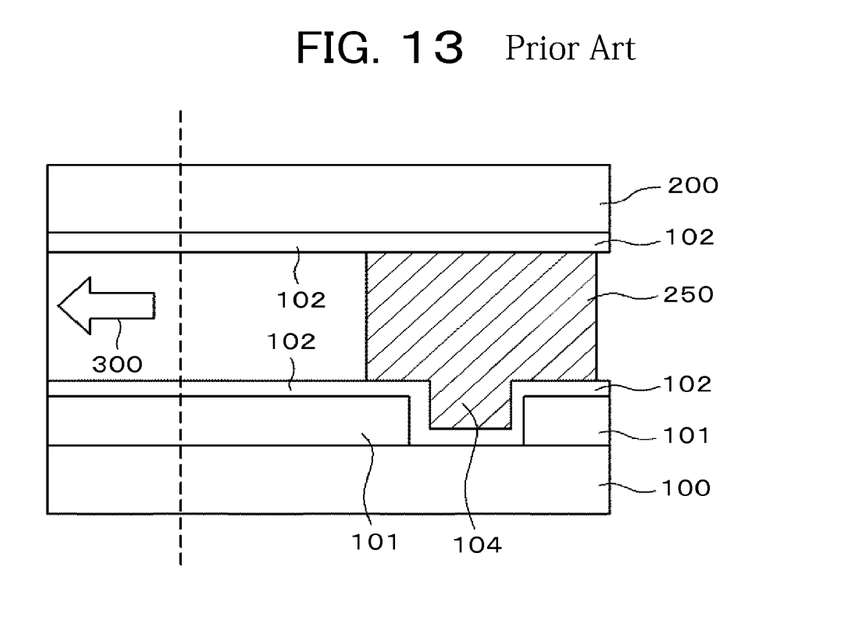
FIG. 13 is a sectional view of a generally employed liquid crystal display device.

FIG. 13 represents an example that an alignment film 102 is applied to an entire lower surface of a seal material 250. Referring to FIG. 13, an organic passivation film 101 is formed on a glass TFT substrate 100, on which the alignment film 102 is formed. Actually, films including a gate insulation film and an inter-layer insulation film are applied to the TFT substrate 100 in addition to the organic passivation film 101. Those films are not shown in FIG. 13. The organic passivation film 101 has its part eliminated to form a recess 104 in a region where a seal material 250 is formed. A TFT, a gate wiring, a video signal line and the like (not shown) are formed on the TFT substrate. It is necessary to prevent corrosion of metal used for forming those elements owing to moisture and the like. Inside of the seal portion will be invaded by external moisture through the organic passivation film 101. Such invasion of the external moisture is blocked by partially eliminating the organic passivation film 101. The alignment film 102 is formed on the organic passivation film 101.

Referring to FIG. 13, the alignment film 102 is formed on a glass counter substrate 200. Actually, films including the color filter, black matrix and overcoat film are formed on the counter substrate 200, which are omitted in FIG. 13 for easy understanding. The alignment film 102 is formed on those films. The counter substrate 200 and the TFT substrate 100 are bonded with the seal material 250.

The alignment films 102 formed on the TFT substrate 100 and the counter substrate 200 have been photo-alignment processed. The photo-alignment process includes photolysis type for dividing a specifically directed polyimide chain that constitutes the alignment film 102 through irradiation of polarized ultraviolet light with wavelength of 300 nm or shorter, photo-dimerization type (photo-crosslinking type) for crosslinking polymer that constitutes the alignment film 102 through irradiation of polarized ultraviolet light with wavelength ranging from 300 nm to 350 nm, photo-isomerization type for isomerizing the polymer that constitutes the alignment film 102 through irradiation of polarized ultraviolet light with wavelength of 350 nm or longer, and the type derived from combining any of the aforementioned types. Irradiation of polarized ultraviolet light through the process of arbitrary type as described above allows the alignment film 102 to exhibit uniaxial anisotropy.

Figure 14:
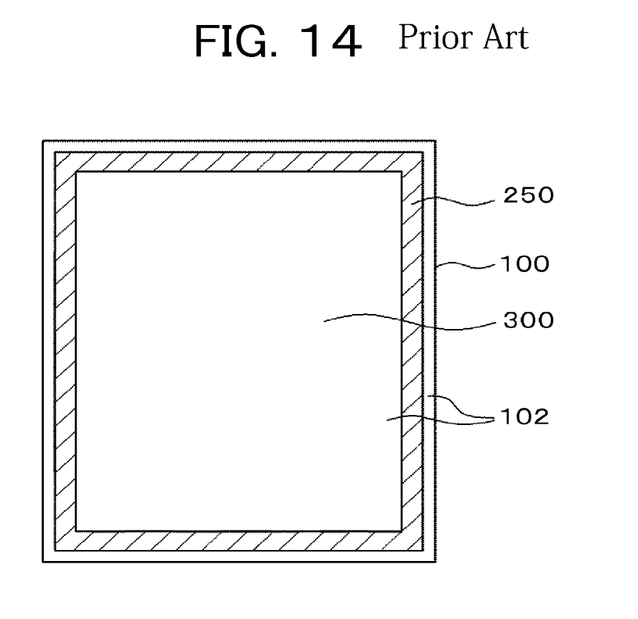
FIG. 14 is a plan view of a part of the liquid crystal display device shown in FIG. 13 at a side of a TFT substrate.

FIG. 14 is a plan view illustrating a state where the seal material 250 is formed on the alignment film 102 at the side of the TFT substrate 100. The seal material 250 is formed on the same alignment film 102 as the one formed on a display region 300. Bonding strength to the seal material 250 is essential for the photo-alignment processed alignment film 102. Reliability of the seal portion is especially the key to the liquid crystal display device as shown in FIGS. 13 and 14 on the ground that the polymer on the surface of the alignment film 102 suffers deterioration by the photochemical reaction in the photo-alignment process, lowering the bonding strength between the alignment film and the seal material.

Figure 15:
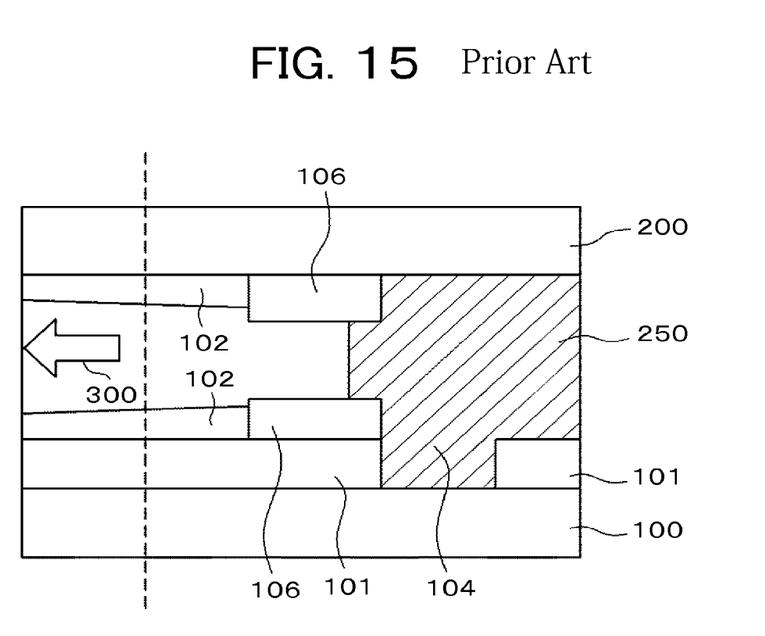
FIG. 15 is a sectional view of another example of a generally employed liquid crystal display device.

FIG. 15 is a sectional view of the structure for accurately controlling the outline of the alignment film 102 on the display region with another alignment film 106 which is formed around the alignment film 102 on the display region 300, and thicker than the alignment film 102 on the display region for preventing the aforementioned problem. The structure shown in FIG. 15 is disclosed in JP-A-2011-145535. Referring to FIG. 15, the alignment film 106 is formed to be partially overlapped with the seal material 250. The alignment film 106 is thicker than the alignment film 102 formed on the display region, which serves as the stopper for the alignment film 102 formed on the display region. As the alignment film 106 is overlapped with the seal material 250 only partially, deterioration in the bonding strength of the seal material 250 is substantially negligible.

As FIG. 15 illustrates, the alignment film 106 serves as the stopper for the alignment film on the display region. As the alignment film 102 to be formed on the display region approaches the alignment film 106, its thickness becomes large. The liquid crystal display device of IPS type is configured that a first electrode is formed to have a plane surface, an inter-layer insulation film is formed on the first electrode, and a second electrode with a plurality of slits is formed on the inter-layer insulation film so as to generate an electric field in the liquid crystal layer through the slits of the second electrode upon application of voltage between the first and the second electrodes, thus controlling rotation of the liquid crystal molecules under the electric field. Intensity of the electric field generated in the liquid crystal layer varies with the film thickness of the alignment film 102. This may cause uneven brightness especially around the display screen. However, an effort to form the display region only in the area where the change in the film thickness of the alignment film 102 is small may enlarge the frame region.

SUMMARY OF THE INVENTION

The invention provides a liquid crystal display device including the photo-alignment processed alignment film, which reduces the frame region, secures reliability of the seal portion, and provides no uneven brightness of the region around the display screen.

The invention overcomes the above problems with the following specific aspects.

(1) The invention provides a liquid crystal display device having a TFT substrate with a first alignment film and a counter substrate with a second alignment film bonded via a seal material, and a liquid crystal interposed between the TFT substrate and the counter substrate. The first alignment film is applied to an entire surface of the TFT substrate, and an organic film that is different from the first alignment film is interposed between the first alignment film and the seal material at a side of the TFT substrate. The second alignment film is applied to an entire surface of the counter substrate, and an organic film that is different from the second alignment film is interposed between the second alignment film and the seal material at a side of the counter substrate. The first alignment film and the second alignment film are photo-alignment processed, and the organic film contains no component to be photo-aligned.

(2) The invention provides a liquid crystal display device having a TFT substrate with a first alignment film and a counter substrate with a second alignment film bonded via a seal material, a liquid crystal interposed between the TFT substrate and the counter substrate, and a distance between the TFT substrate and the counter substrate regulated by a columnar spacer. The first alignment film is applied to an entire surface of the TFT substrate, and an organic film that is different from the first alignment film is interposed between the first alignment film and the seal material at a side of the TFT substrate. An outline of the second alignment film at a side of the counter substrate is regulated by an alignment film barrier formed of the same material for forming the columnar spacer. The first alignment film and the second alignment film are photo-alignment processed, and the organic film contains no component to be photo-aligned.

(3) The alignment film barrier is formed on the counter substrate to be overlapped with the seal material.

(4) The invention provides a liquid crystal display device having a TFT substrate with a first alignment film and a counter substrate with a second alignment film bonded via a seal material, and a liquid crystal interposed between the TFT substrate and the counter substrate. The first alignment film applied to the TFT substrate is formed on a display region, and a first mixture film that is different from the alignment film is interposed between the seal material and the TFT substrate. The first alignment film applied to the counter substrate is formed on the display region, and a second mixture film that is different from the alignment film is interposed between the seal material and the TFT substrate. The first alignment film and the second alignment film are photo-alignment processed, and the first mixture film is formed by mixing a material for forming the first alignment film and a material for forming a first organic film with no component to be photo-aligned, and the second mixture film is formed by mixing a material for forming the second alignment film and a material for forming a second organic film with no component to be photo-aligned.

(5) The same material is used for forming the first and the second alignment films, the same material is used for forming the first and the second organic films, a content of the photo-aligned component of the first mixture film is smaller than 20%, and a content of the photo-aligned component of the second mixture film is smaller than 20%.

(6) The invention provides a liquid crystal display device having a TFT substrate with a first alignment film and a counter substrate with a second alignment film bonded via a seal material, a liquid crystal interposed between the TFT substrate and the counter substrate, and a distance between the TFT substrate and the counter substrate regulated by a columnar spacer. The first alignment film applied to the TFT substrate is formed on a display region, and a first mixture film that is different from the alignment film is interposed between the seal material and the TFT substrate. The first mixture film is obtained by mixing a material for forming the first alignment film and a material for forming a first organic film with no component to be photo-aligned. An outline of the second alignment film at the side of the counter substrate is regulated by an alignment film barrier formed of the same material for forming the columnar spacer. The first alignment film and the second alignment film are photo-alignment processed.

(7) A content of a component to be photo-aligned of the first mixture film is smaller than 20%.

The invention ensures bonding strength of the seal material to the TFT substrate or the counter substrate, and even film thickness of the alignment film on the display region. This makes it possible to realize the liquid crystal display device with a reduced frame region and excellent image quality as well as reliability at the seal portion.

DETAILED DESCRIPTION OF THE EMBODIMENT

The invention will be described in detail, in reference to the following embodiments.

First Embodiment

Figure 1:
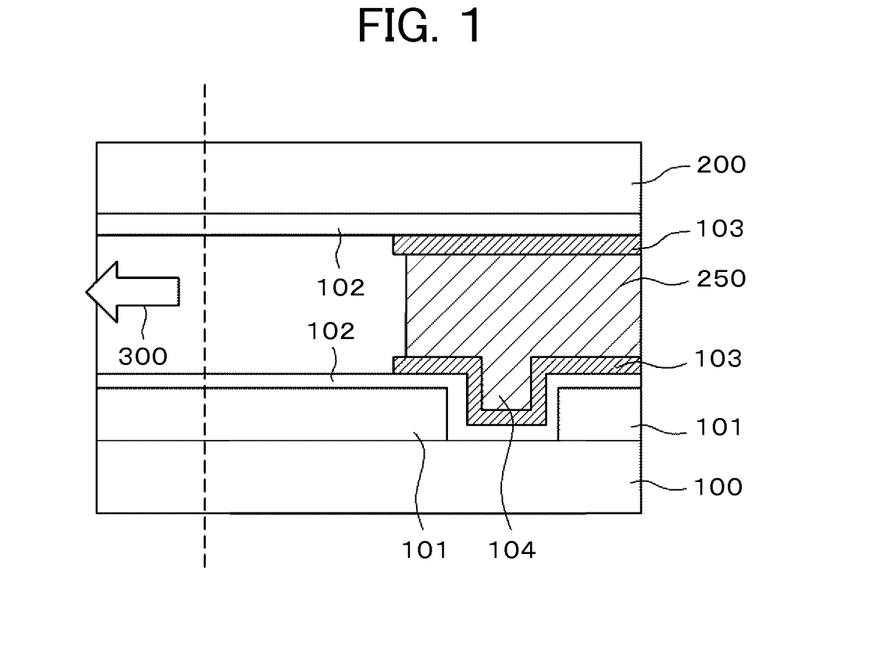
FIG. 1 is a sectional view of a liquid crystal display device according to a first embodiment.

FIG. 1 is a sectional view illustrating a first embodiment of the invention. An organic passivation film 101 with a recess or an eliminated portion 104 is formed on a TFT substrate 100, and an alignment film 102 is further formed on the organic passivation film. The aforementioned structure is similar to the one described referring to FIG. 13 as well as the function of the recess 104. The gate insulation film, the inter-layer insulation film and the like formed on the TFT substrate 100 are omitted in the drawing as already explained referring to FIG. 13. The structure applies to the following embodiments unless otherwise specified.

Referring to FIG. 1, the structure having the alignment film 102 formed on the counter substrate 200 is also similar to the one described referring to FIG. 13. Films including the color filter, black matrix, overcoat film and the like formed on the counter substrate 200 are omitted in the drawing as already explained referring to FIG. 13. The respective alignment films 102 formed on the TFT substrate 100 and the counter substrate 200 have been photo-alignment processed.

FIG. 1 is different from FIG. 13 representing the generally employed structure in an organic film 103 applied onto the alignment film 102 at a part where a seal material 250 is formed. In other words, the photo-alignment process is executed through irradiation of polarized ultraviolet light with wavelength of 300 nm or shorter when the alignment film 102 is of photolysis type. The photo-alignment process is executed through irradiation of polarized ultraviolet light with wavelength ranging from 300 to 350 nm when the alignment film 102 is of photo dimerization type (photo crosslinking type). The photo-alignment process is executed through irradiation of polarized ultraviolet light with wavelength of 350 nm or longer when the alignment film 102 is of photo-isomerization type. Irradiation of ultraviolet light as described above deteriorates the alignment film 102 to impair bonding strength to the seal material 250. The embodiment is configured to form the organic film 103 that exhibits bonding strength to both the seal material 250 and the alignment film 102 prior to the photo-alignment process, and is not susceptible to the influence of the ultraviolet light irradiation on the alignment film 102 at the part where the seal material 250 is formed. That is, the part of the alignment film 102 on which the seal material 250 is formed is covered with the organic film 103 so as to retain bonding strength to the seal material 250.

Referring to FIG. 1, the area indicated by a white arrow denotes a display region 300. Each end of the organic films 103 extends to exceed the end of the seal material 250 toward the display region 300. The structure ensures to retain bonding strength between the seal material 250 and the organic film 103 sufficiently.

The specific structure as shown in FIG. 1 will be described. The alignment film 102 is available for the photo-alignment process, which has the polymer component to be photo-aligned by 20% to 100%, to the whole. Meanwhile, the organic film 103 has no component to be photo-aligned. Polyamic acid which contains cyclobutane as shown in a chemical formula 1 is used for forming the alignment film 102 of photolysis type, which is photo-aligned.

Chemical formula 1

Each of $R_1$ and $R_2$ denotes an independent hydrogen atom or alkyl group. The material which contains cinnamic acid, ester of cinnamic acid, coumarin, chalcone and benzophenone is used as another material for forming the alignment film 102 of photo dimerization type (photo crosslinking type). The material which contains azobenzene or stilbene is used for forming the alignment film of photo isomerization type.

Meanwhile, a chemical formula 2 may be used for forming the material of the organic film that is not photo-aligned.

Chemical formula 2

The chemical formula 2 represents a general chemical structure of polyamic acid except the material expressed by the chemical formula 1, that is, the material that contains cyclobutane, the one that contains cinnamic acid, ester of cinnamic acid, coumarin, chalcone, benzophenone, and the one that contains azobenzene or stilbene. In reference to the chemical formula 2, $P^1$ denotes a tetravalent organic group, and $Q^1$ denotes a divalent organic group.

Each of chemical formulae 3 and 4 denotes a general chemical structure of tetracarboxylic acid dianhydride used for polyamic acid synthesis.

Chemical formula 3

Chemical formula 4

Each of $R^4$, $R^5$, $R^7$ and $R^8$ denotes an independent hydrogen atom or alkyl group. Each of $R^6$ and $R^9$ denotes an independent divalent organic group with aromatic ring. The following material groups may be used as the specific tetracarboxylic acid dianhydride.

Aliphatic tetracarboxylic acid dianhydride such as butanetetracarboxylic acid dianhydride; pyromellitic acid dianhydride, 3,3',4,4'-benzophenonetetracarboxylic acid dianhydride, 3,3',4,4'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenylethertetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3'4,4'-perfluoroisopropylidenediphthalic acid dianhydride, 3,3',4,4'-biphenyltetracarboxylic acid dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycolic)bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), and 2,2-bis(4-hydroxyphenyl)propane-bis(anhydrotrimellitate).

It is possible to use the aforementioned material by 1 kind singly or optionally 2 or more kinds.

Specifically, the following materials may be used as diamine for polyamic acid synthesis.

Aromatic diamine including p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 2,2'-dimethyl-4,4'-diaminobiphenyl, 3,3'-dimethyl-4,4'-diaminobiphenyl, 4,4'-diaminobenzanilide, 4,4'-diaminodiphenylether, 1,5-diamidonaphthalene, 3,3-dimethyl-4,4'-diaminobiphenyl, 5-amino-1-(4'-aminophenyl)-1,3,3-trimethylindan, 6-amino-1-(4'-aminophenyl)-1,3,3-trimethylindan, 3,4'-diaminodiphenylether, 3,3'-diaminobenzophenone, 3,4'-diaminobenzophenone, 4,4'-diaminobenzophenone, 2,2-bis[4-(4-aminophenoxyl)phenyl]propane, 2,2-bis[4-(4-aminophenoxyl)phenyl] hexafluoropropane, 2,2-bis(4-aminophenyl) hexafluoropropane, 2-2-bis[4-(4-aminophenoxyl)phenyl] sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 1,4,4'-(p-phenyleneisopropylidene)bisaniline, 4,4'-(m-phenylene isopropylidene)bisaniline, 2,2'-bis[4-(4-amino-2-trifluoromethylphenoxy)phenyl]hexafluoropropane, 4,4'-diamino-2,2'-bis (trifluoromethyl)biphenyl, and 4,4'-bis[(4-amino-2-trifluoromethyl)phenoxy]-octafluorobiphenyl; aliphatic and alicyclic diamine including 1,1-metaxylilenediamine, 1,3-propanediamine, tetramethylenediamine, pentamethylenediamine, hexamethylenediamine, heptamethylenediamine, octamethylenediamine, nonamethylenediamine, 4-4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6.2.1.02,7]-undecylenedimethyldiamine, and 4,4'-methylenebis(cyclohexylamine); and diamine with two primary amino groups and nitrogen atom except the primary amino group within its molecule including 2,3-diaminopyridine, 2,6-diaminopyridine, 3,4-diaminopyridine, 2,4-diaminopyridine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 3,5-diamino-1,2,4-triazole, 6,9-diamino-2-ethoxyacridinelactate, 3,8-diamino-6-phenylphenanthridine, 1,4-diaminopiperazine, 3,6-diaminoacridine, and bis(4-aminophenyl)phenylamine.

According to the embodiment, the seal material 250 is not directly bonded to the alignment film 102, but is in contact with the organic film 103 which is not deteriorated by ultraviolet light for the photo-alignment process so that the bonding strength of the seal material 250 is retained. Meanwhile, it is possible to apply the alignment film 102 to an entire surface of the TFT substrate 100 or the counter substrate 200. Therefore, the range for applying the alignment film 102 does not have to be controlled, thus preventing uneven film thickness of the alignment film 102. On the other hand, it is not necessary to form the organic film 103 on the display region 300. The organic film may be formed only on the part where the seal material 250 is formed, resulting in easy control of application range of the organic film 103. This makes it possible to reduce the area around the display region 300, so called the frame region, and ensure reliability of the seal portion. Before irradiation of ultraviolet light, the organic film 103 is formed subsequent to formation of the alignment film 102.

Figure 2:
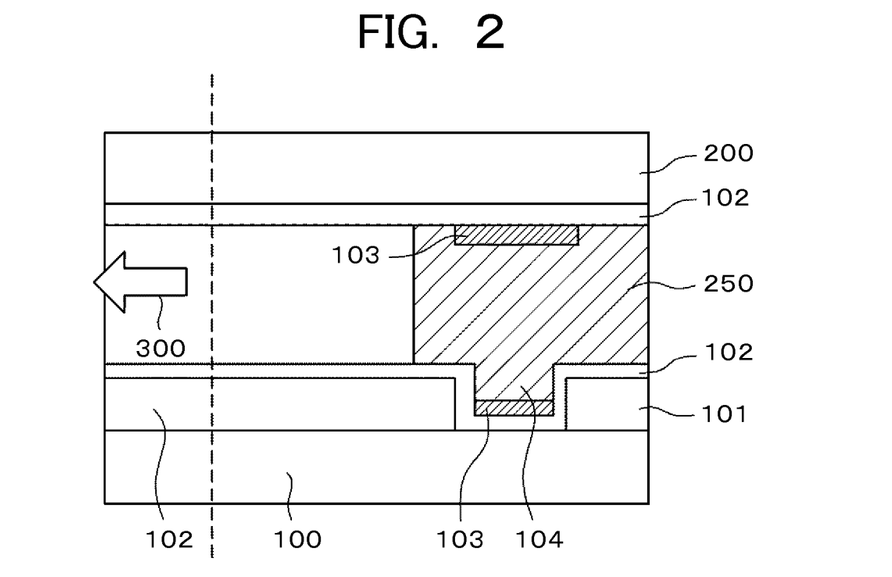
FIG. 2 is a sectional view of a liquid crystal display device as another example of the first embodiment.

FIG. 2 is a sectional view of a liquid crystal display panel as another example of the embodiment. Referring to FIG. 2, like the structure shown in FIG. 1, the organic film 103 is formed on the alignment film 102 at the part where the TFT substrate 100 and the counter substrate 200 are bonded. FIG. 2 shows that each width of the organic films 103 both at the side of the TFT substrate 100 and the counter substrate 200 is smaller than that of the seal material 250. As FIG. 2 shows, the organic film 103 is formed in the recess or the eliminated portion 104 of the organic passivation film 101 at the side of the TFT substrate 100. It is also possible to form the organic film on any other part which covers the area from the bottom of the recess or the eliminated portion to the tapered part, and from the tapered part to the section with no recess or the eliminated portion.

In the example shown in FIG. 2, the seal material 250 is not entirely in contact with the organic film 103. However, the structure of the example ensures the bonded area between the seal material 250 and the organic film 103, which is sufficient to retain bonding strength. The embodiment provides the advantage to bring the end of the display region 300 closer to the seal material 250 since the width of the organic film 103 is smaller than that of the seal material 250. This makes it possible to further reduce the width of the frame region.

A manufacturing method of the embodiment will be described. The material for forming the alignment film is applied to the entire surface of the TFT substrate or the counter substrate, and pre-calcinated at the temperature ranging from 50° C. to 100° C. for evaporating the solvent. Thereafter, the organic film is applied, and pre-calcinated for evaporating the solvent. Then the alignment film and the organic film are subjected to a main calcination process at the temperature ranging from 200° C. to 250° C. for imidization. It is possible to apply the material for forming the alignment film or the organic film through ink jetting. The process is applicable to the other embodiments.

Second Embodiment

Figure 3:
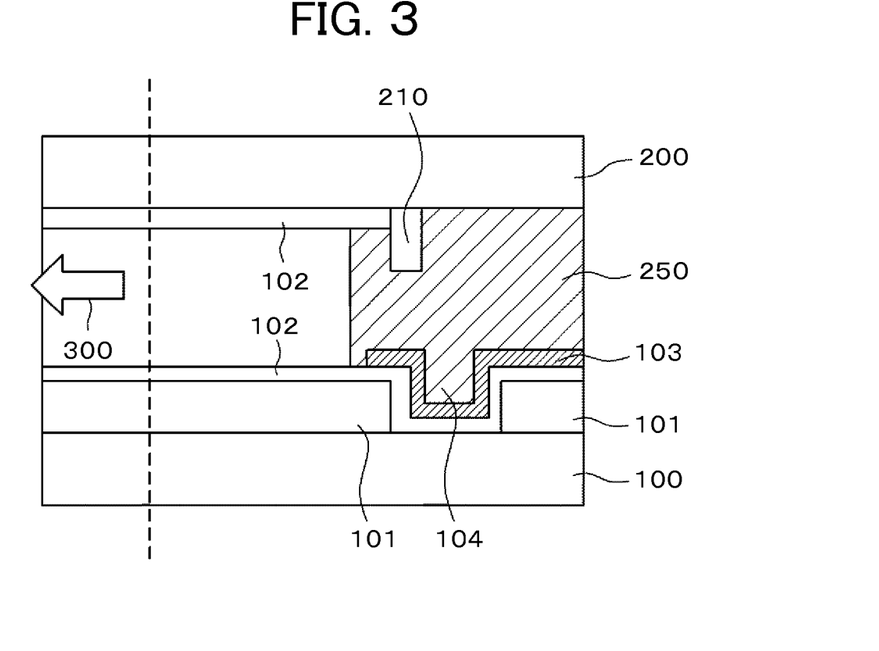
FIG. 3 is a sectional view of a liquid crystal display device according to a second embodiment.

FIG. 3 is a sectional view of a part around a seal portion of a liquid crystal display panel according to a second embodiment of the invention. Referring to FIG. 3, the part at the side of the TFT substrate 100 is similar to that of the second example of the first embodiment as shown in FIG. 2. The structure shown in FIG. 3 is different from the one shown in FIG. 2 in the part at the side of the counter substrate 200. At the side of the counter substrate 200, the range for applying the alignment film 102 is controlled by an alignment film barrier 210 formed through the same process for forming a columnar spacer. The columnar spacer is formed on the counter substrate 200 to regulate the distance between the TFT substrate 100 and the counter substrate 200. For example, acrylic resin is available as the material for forming the columnar spacer. It is possible to form the alignment film barrier 210 with its height smaller than that of the columnar spacer formed on the display region 300 through half exposure process.

It is effective to form the alignment film barrier 210 into a wall-like or a closed bank-like configuration rather than the columnar configuration for boundary control of the alignment film. Use of the alignment film barrier 210 to regulate the application area of the alignment film 102 may cause the problem of uneven thickness of the alignment film 102 at the part around the alignment film barrier 210 as has been described in reference to JP-A-2011-145535. However, unlike the TFT substrate 100, the counter substrate 200 has neither pixel electrodes nor the counter electrodes. Therefore, the structure hardly causes the problem of uneven horizontal electric field for controlling liquid crystal molecules.

At the side of the counter substrate 200, the application area of the alignment film 102 is regulated by the alignment film barrier 210 that is formed to be overlapped with the seal material 250. In this case, it is possible to reduce the overlapped range between the alignment film 102 and the seal material 250 so as to ensure sufficient strength of bonding between the seal material 250 and the counter substrate 200. At the side of the counter substrate 200 as shown in FIG. 3, the seal material 250 applied to the part in the absence of the alignment film 102 is bonded to a not-shown overcoat film.

Referring FIG. 3, the alignment film barrier 210 is formed to be overlapped with the seal material 250. It is also possible to form the alignment film barrier 210 so as not to be overlapped with the seal material 250 at the side apart therefrom toward the display region. In such a case, although the frame region becomes slightly larger, reliability of the seal portion may be improved. This applied to the structures to be described later in reference to FIGS. 4, 5, 11 and 12.

Meanwhile, the alignment film barrier 210 is not formed at the side of the TFT substrate 100. The alignment film 102 reaches the end of the TFT substrate 100. This may not cause the problem of uneven film thickness of the alignment film 102. Bonding strength between the seal material 250 and the TFT substrate 100 is ensured by the bonding strength between the organic film 103 formed on the alignment film 102 and the seal material 250.

Figure 4:
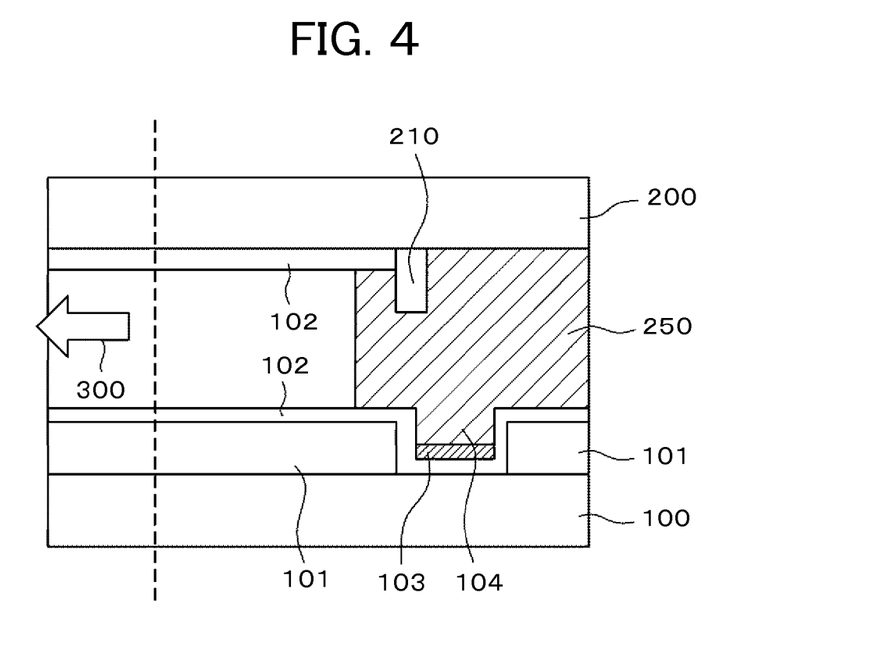
FIG. 4 is a sectional view of a liquid crystal display device as another example of the second embodiment.

Referring to FIG. 3, the organic film 103 at the side of the TFT substrate 100 is formed along the recess 104 of the organic passivation film 101. However, it is possible to form the organic film in a wide range of application so long as its width does not exceed that of the seal material 250. The range for forming the organic film 103 may be determined in consideration of accuracy of the process for controlling the width of the organic film 103 and bonding strength. The structure at the side of the counter substrate 200 as shown in FIG. 4 is similar to the one described referring to FIG. 3.

Figure 5:
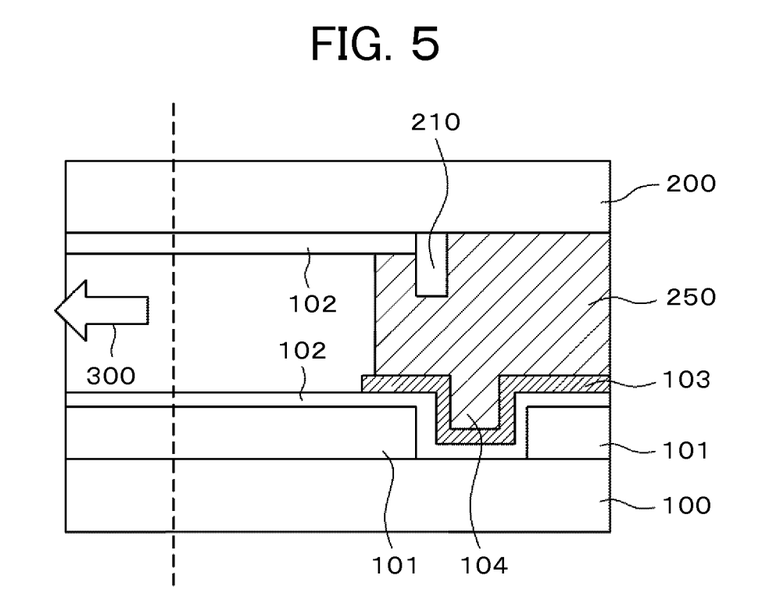
FIG. 5 is a sectional view of a liquid crystal display device as still another example of the second embodiment.

FIG. 5 is a sectional view of the liquid crystal display panel as a second example of the embodiment at the part around the seal portion. The part at the side of the counter substrate 200 shown in FIG. 5 is similar to the one described referring to FIG. 3. The TFT substrate 100 is similar to the one described in the first embodiment referring to FIG. 1. That is, at the seal portion, the seal material 250 is bonded only to the organic film 103 so as to ensure sufficient bonding strength between the TFT substrate 100 and the seal material 250. Referring to FIGS. 3 to 5, the method of forming the alignment film 102 and the organic film 103 at the side of the TFT substrate 100 is similar to the one described in the first embodiment.

In the example shown in FIG. 5, it is possible to limit the contact area between the seal material 250 and the alignment film 102 at the side of the counter substrate 200 as well, allowing increase in the bonded area to the not-shown overcoat film. At the side of the TFT substrate 100, the seal material 250 is in contact only with the organic film 103 which is not deteriorated by ultraviolet light. This makes it possible to ensure high reliability of the seal portion.

Third Embodiment

Figure 6:
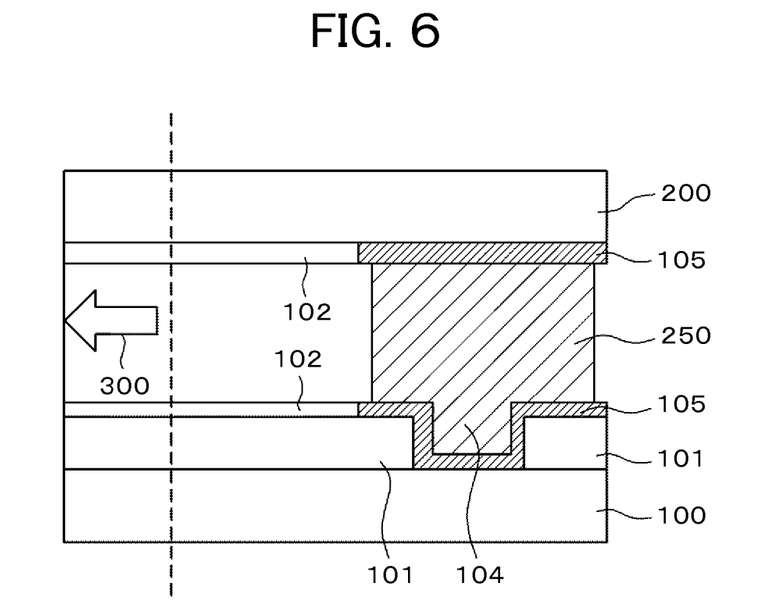
FIG. 6 is a sectional view of a liquid crystal display device according to a third embodiment.

FIG. 6 is a sectional view of the liquid crystal display panel according to a third embodiment of the invention at a part around the seal portion. Referring to FIG. 6, the display region 300 at the TFT substrate 100 and the counter substrate 200 is defined by the alignment film 102. The part in contact with the seal material 250 is formed by a mixture film 105 as a mixture of the alignment film 102 and the organic film 103. As FIG. 6 shows, the part indicated by the white arrow is the display region 300. The mixture film 105 has only a small component to be photo-aligned. Therefore, the degree of deterioration of the film caused by the ultraviolet light for the photo-alignment process is low, thus ensuring bonding strength to the seal material 250.

Figure 7:
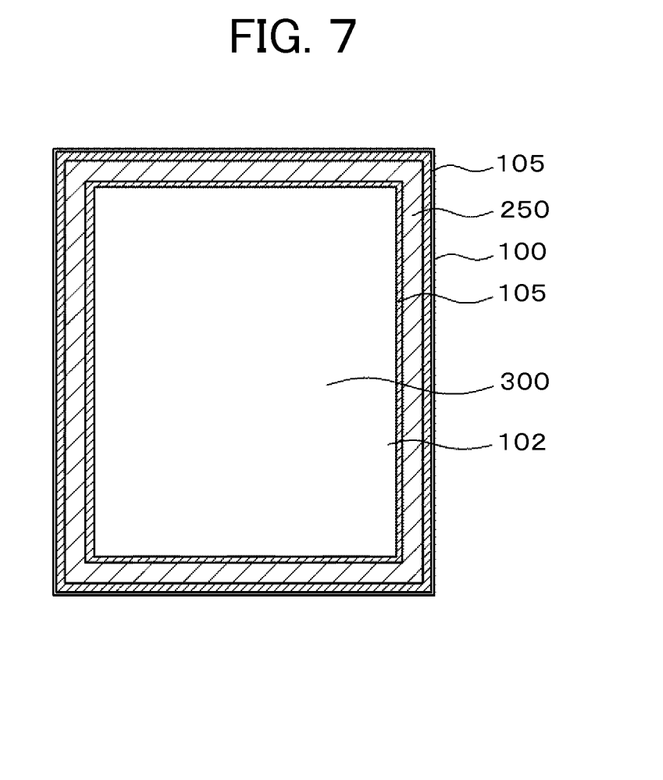
FIG. 7 is a plan view of a part of the liquid crystal display device as shown in FIG. 6 at a side of a TFT substrate.

FIG. 7 is a plan view of the part at the side of the TFT substrate 100 according to the embodiment. Referring to FIG. 7, the alignment film 102 is formed on the display region, and the mixture film 105 is formed outside. The seal material 250 is formed on the mixture film 105. The mixture film 105 has the width larger than that of the seal material 250.

A manufacturing method of the structure as shown in FIGS. 6 and 7 will be described, taking the part at the side of the TFT substrate as the example. The material for forming the organic film is applied to the area around the substrate, and pre-calcinated at the temperature ranging from 50° C. to 100° C. for evaporating the solvent. Thereafter, the alignment film is applied to the entire surface of the TFT substrate, and pre-calcinated for evaporating the solvent. It is possible to apply the alignment film and the organic film through ink jetting.

The organic film having the solvent evaporated is dissolved in the solvent of the alignment film which is applied to the organic film. Those films are mixed to generate the film with component different from that of the alignment film. The alignment film and the mixture film are then heated at the temperature ranging from 200° C. to 250° so as to be subjected to the main calcination.

Figure 8:
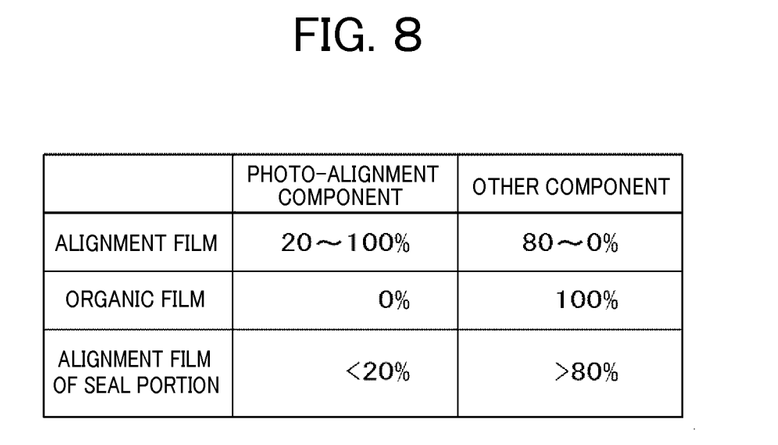
FIG. 8 is a table representing each proportion of a photo-alignment component to the other component of an alignment film, an organic film, and a mixture film.

FIG. 8 is a table presenting each proportion of the photo-alignment component to the other component of the alignment film, the organic film for forming the mixture film, and the mixture film, which are used for the embodiment. Referring to FIG. 8, the content of the photo-alignment component of the alignment film is in a range from 20 to 100%, and the content of the other component that is not photo-aligned is in a range from 0 to 80%. The content of the photo-alignment component of the organic film is 0%, and the content of the other component that is not photo-aligned is 100%. As a result, the content of the photo-alignment component of the mixture film is smaller than 20%, and the content of the other component which is not photo-aligned is larger than 80%.

As FIG. 8 shows, the content of the photo-alignment component of the mixture film is smaller than 20%, resulting in a low degree of deterioration in the film owing to ultraviolet light for photo-alignment. This makes it possible to sufficiently retain bonding strength between the seal material and the mixture film, ensuring reliability of the seal portion.

Figure 9:
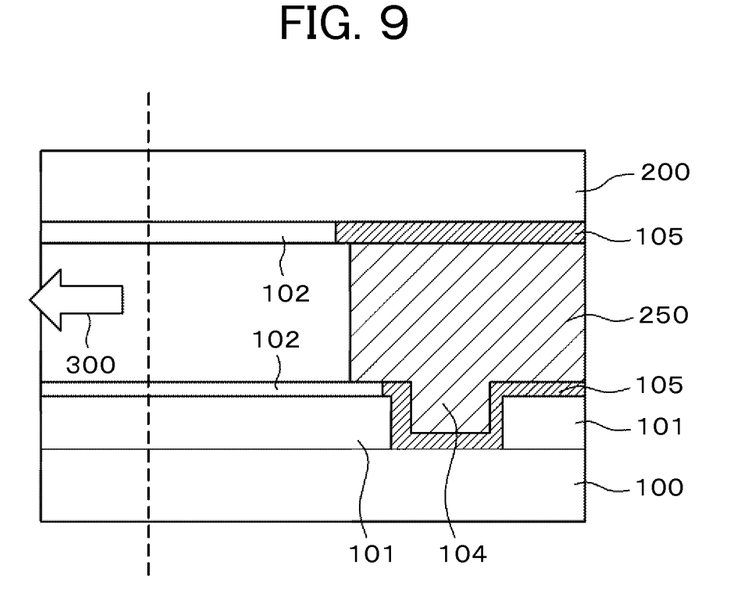
FIG. 9 is a sectional view of a liquid crystal display device as another example of the third embodiment.

FIG. 9 is a sectional view of a second example of the embodiment. The structure shown in FIG. 9 is different from the one shown in FIG. 6 in the width of the mixture film 105 applied to the TFT substrate 100, which is smaller than that of the seal material 250. At the side of the TFT substrate 100, the recess 104 serves to increase the bonding area between the mixture film 105 and the seal material 250. Then bonding strength at the side of the TFT substrate 100 may be ensured in spite of reduced width of the mixture film 105. Correspondingly, it becomes easier to control the application range of the mixture film 105 at the side of the TFT substrate 100.

Figure 10:
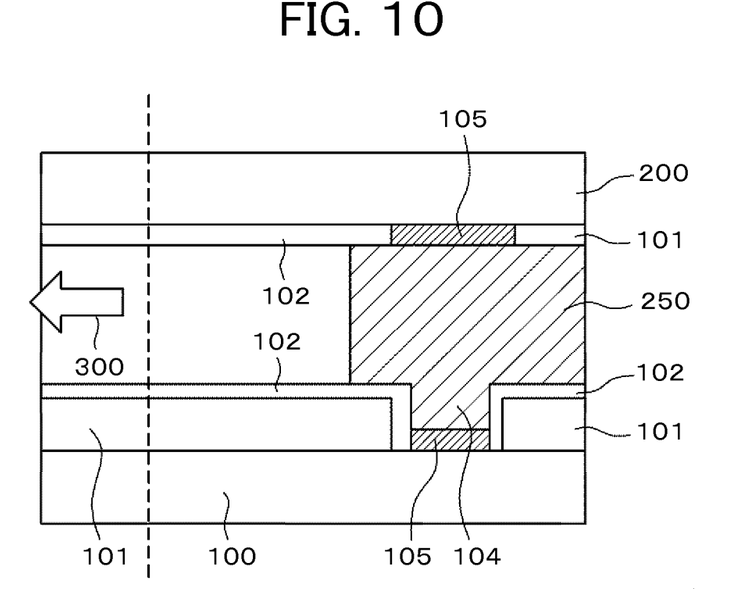
FIG. 10 is a sectional view of a liquid crystal display device as still another example of the third embodiment.

FIG. 10 is a sectional view of a third example of the embodiment. The structure shown in FIG. 10 is different from the one shown in FIG. 6 in that each width of the mixture film 105 at both sides of the TFT substrate 100 and the counter substrate 200 is smaller than the width of the seal material 250. If content of the photo-alignment component of the mixture film 105 is small, bonding strength between the mixture film 105 and the seal material 250 may be retained in spite of reduction in the width of the mixture film 105. Correspondingly, the width of the so-called frame region is decreased so as to expand the display region.

The aforementioned embodiment has been described on the assumption that the same material is used for forming the alignment film 102 and the mixture film 105 applied to the TFT substrate 100, and those applied to the counter substrate 200. Besides, the material for forming the alignment film 102 and the mixture film 105 applied to the TFT substrate 100 may be different from the one for forming those applied to the counter substrate 200. It is, however, characteristically advantageous and less costly to use the same material for forming the alignment film 102 and the mixture film 105 applied both to the TFT substrate 100 and the counter substrate 200.

As described above, the embodiment allows application of the alignment film to the entire surfaces of the TFT substrate and the counter substrate. This makes it possible to ensure even film thickness of the alignment film on the display region.

Fourth Embodiment

Figure 11:
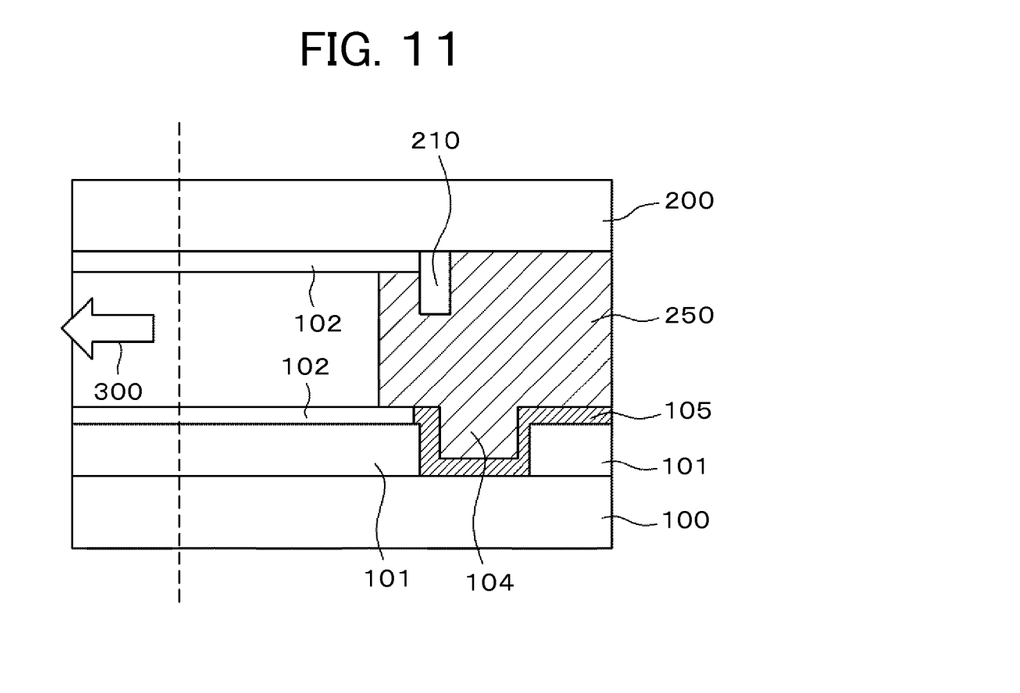
FIG. 11 is a sectional view of a liquid crystal display device according to a fourth embodiment.

FIG. 11 is a sectional view of a fourth embodiment of the invention. The part at the side of the TFT substrate 100 shown in FIG. 11 is similar to the one described in the third embodiment as shown in FIG. 9. Specifically, the alignment film 102 is formed on the display region 300 at the side of the TFT substrate 100. The mixture film 105 is formed on the region where the seal material 250 is formed, which has the width smaller than that of the seal material 250. The mixture film 105 is obtained by mixing materials for forming the alignment film 102 and the organic film 103. The materials for forming the alignment film 102 and the mixture film 105 are similar to those already described in the first embodiment. Each proportion of the photo-alignment component to the other component of the alignment film 102, the organic film 103 and the mixture film 105 is similar to the one as described referring to FIG. 8.

Referring to FIG. 11, the alignment film barrier 210 which is formed simultaneously with the columnar spacer is applied to the counter substrate 200 so as to regulate the application area of the alignment film 102. The structure and effect of the seal portion at the side of the counter substrate 200 are similar to those described in the second embodiment, and explanations thereof will be omitted.

Figure 12:
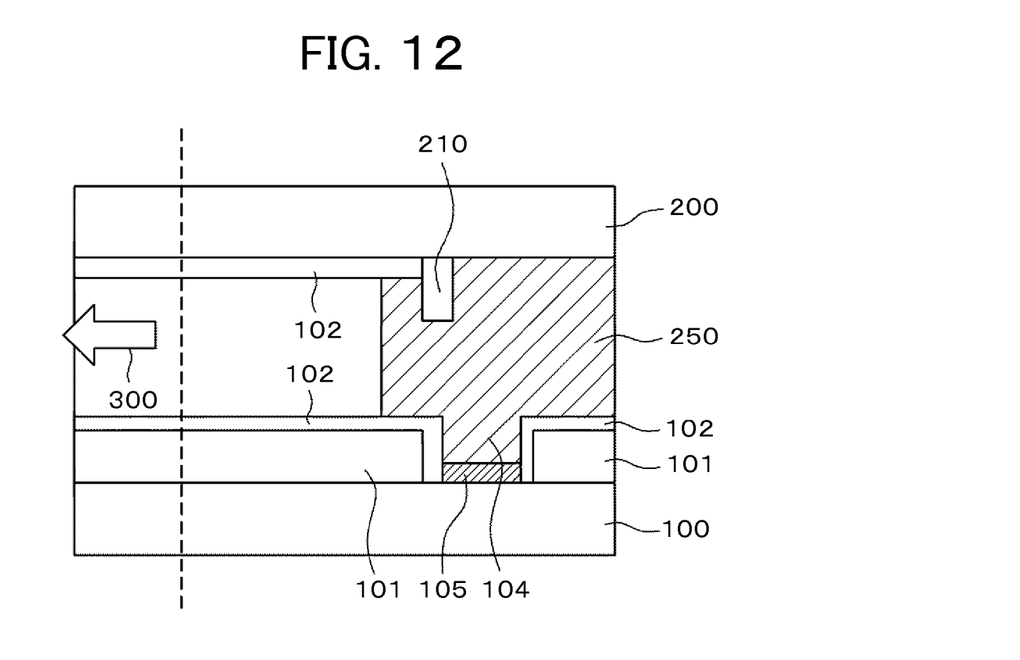
FIG. 12 is a sectional view of a liquid crystal display device as another example of the fourth embodiment.

FIG. 12 is a sectional view of another example of the embodiment. As FIG. 12 shows, the mixture film 105 is applied to the bottom of the recess 104 of the organic passivation film 101 on the TFT substrate 100. Bonding strength between the mixture film 105 and the seal material 250 retains the bonding strength between the seal material and the TFT substrate 100 at the seal portion. Referring to the example of FIG. 12, the application range of the mixture film 105 is smaller than the one described in the example shown in FIG. 11. The content of the photo-alignment component of the material for forming the mixture film 105 shown in FIG. 12 is decreased to be smaller than the one of the mixture film 105 shown in FIG. 11. This ensures that bonding strength of the seal portion shown in FIG. 12 is retained as rigid as the case described referring to FIG. 11.

The method of forming the alignment film 102 and the mixture film 105 at the side of the TFT substrate 100 according to the example of the embodiment shown in FIG. 12 is similar to the method as described in the third embodiment. The structure at the side of the counter substrate 200 according to the example shown in FIG. 12 is similar to the one described referring to FIG. 11, and explanation thereof will be omitted. As FIGS. 11 and 12 show, the width of the mixture film is smaller than that of the seal material 250 at the side of the TFT substrate 100. However, the embodiment is not limited to the aforementioned structure. It is possible to increase the width of the mixture film 105 to be larger than that of the seal material 250.

Like the other embodiments, this embodiment makes it possible to expand the display region by reducing the frame region, and ensures reliability of the seal portion.

The TFT substrate has a terminal region where a plurality of terminals exists. The terminals are connected to a flexible printed circuit and/or a drive IC chip. An entire TFT substrate consists of the display region, frame region and the terminal region.

It is possible to apply a first alignment film, which is an alignment film on the TFT substrate, to an entire surface of the TFT substrate except for the terminal region. In other words, the first alignment film can be applied to an entire region of the display region and the frame region of the TFT substrate in the present invention.

What is claimed is:

1. A liquid crystal display device having a TFT substrate with a first alignment film and a counter substrate with a second alignment film bonded via a seal material, a liquid crystal interposed between the TFT substrate and the counter substrate, and a distance between the TFT substrate and the counter substrate regulated by a columnar spacer,
    an alignment film barrier formed at a side of the counter substrate,
    wherein the first alignment film is applied to a surface of the TFT substrate, and an organic film that is different from the first alignment film is interposed between the first alignment film and the seal material at a side of the TFT substrate;
    wherein the alignment film is overlapped with the seal material;
    the first alignment film and the second alignment film are photo-alignment processed, and the organic film contains no component to be photo-aligned, and
    the alignment film barrier is formed on the counter substrate to be overlapped with the seal material.

2. The liquid crystal display device according to claim 1, wherein the alignment film barrier is formed by a same material as the columnar spacer.

3. The liquid crystal display device according to claim 1, wherein a shape of the alignment film barrier is a wall-like shape or a closed bank-like shape.

4. A liquid crystal display device having a TFT substrate with a first alignment film and a counter substrate with a second alignment film bonded via a seal material, and a liquid crystal interposed between the TFT substrate and the counter substrate,
    wherein the first alignment film applied to the TFT substrate is formed on a display region, and a first mixture film that is different from the alignment film is interposed between the seal material and the TFT substrate;
    the second alignment film applied to the counter substrate is formed on the display region, and a second mixture film that is different from the alignment film is interposed between the seal material and the counter substrate; and
    the first alignment film and the second alignment film are photo-alignment processed, and the first mixture film is formed by mixing a material for forming the first alignment film and a material for forming a first organic film with no component to be photo-aligned, and the second mixture film is formed by mixing a material for forming the second alignment film and a material for forming a second organic film with no component to be photo-aligned.

5. The liquid crystal display device according to claim 4, wherein the same material is used for forming the first and the second alignment films, the same material is used for forming the first and the second organic films, a content of the photo-aligned component of the first mixture film is smaller than 20%, and a content of the photo-aligned component of the second mixture film is smaller than 20%.

6. A liquid crystal display device having a TFT substrate with a first alignment film and a counter substrate with a second alignment film bonded via a seal material, a liquid crystal interposed between the TFT substrate and the counter substrate, and a distance between the TFT substrate and the counter substrate regulated by a columnar spacer
    wherein the first alignment film applied to the TFT substrate is formed on a display region, and a first mixture film that is different from the alignment film is interposed between the seal material and the TFT substrate;
    the first mixture film is obtained by mixing a material for forming the first alignment film and a material for forming a first organic film with no component to be photo-aligned;
    an outline of the second alignment film at the side of the counter substrate is regulated by an alignment film barrier formed of the same material for forming the columnar spacer; and
    the first alignment film and the second alignment film are photo-alignment processed.

7. The liquid crystal display device according to claim 6, wherein a content of a component to be photo-aligned of the first mixture film is smaller than 20%.

* * * * *